June 26, 1956  M. MERMELSTEIN  2,752,182
VIBRATORY SANDER
Filed May 16, 1952  2 Sheets-Sheet 1
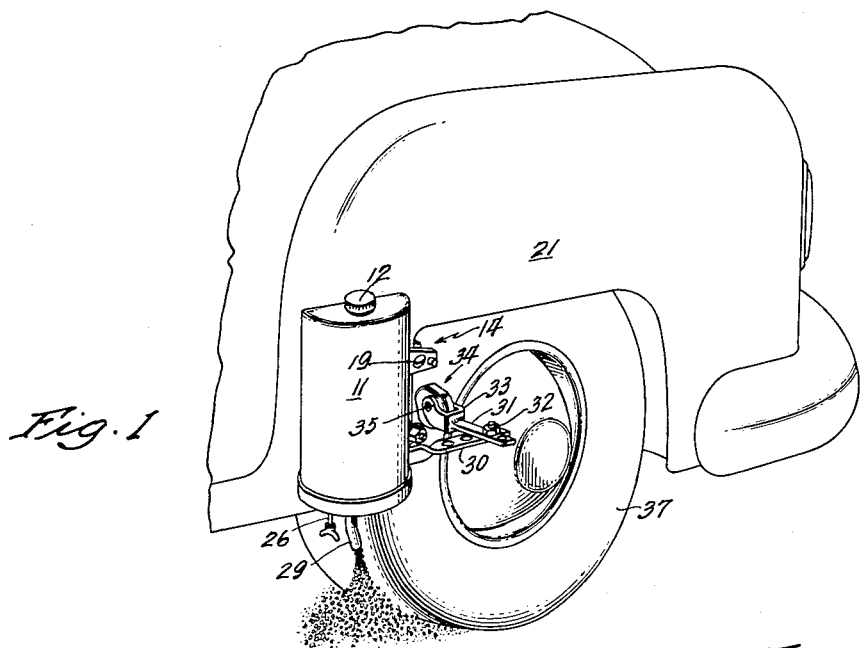
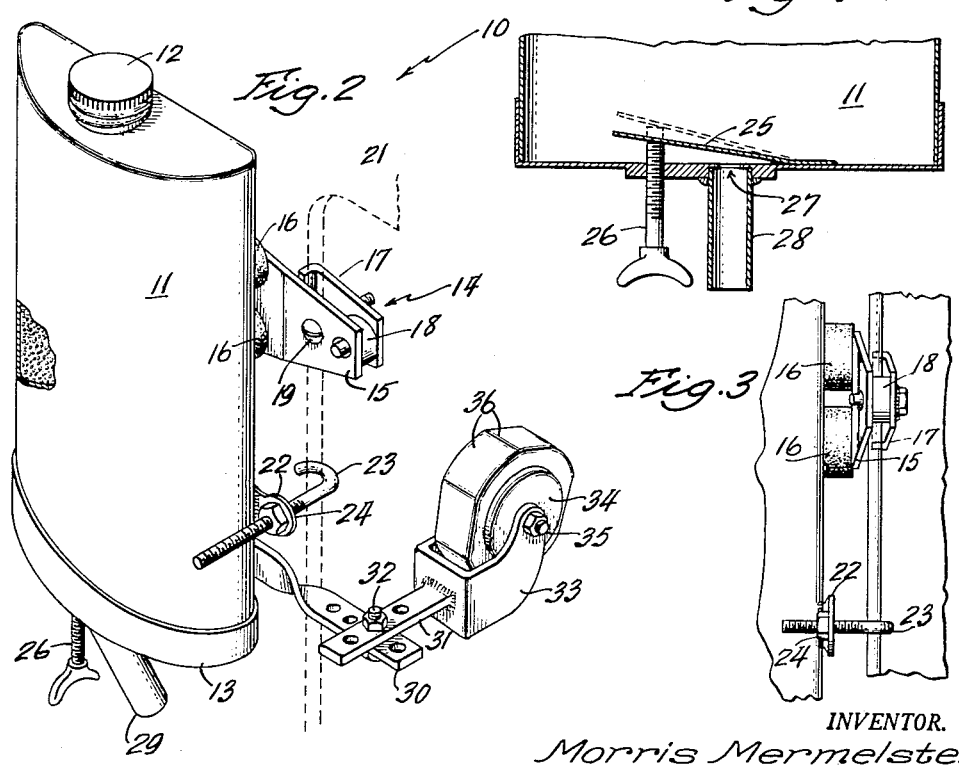
INVENTOR.
Morris Mermelstein,
BY
Andros and Smith
His Attorneys.

June 26, 1956 — M. MERMELSTEIN — 2,752,182
VIBRATORY SANDER
Filed May 16, 1952 — 2 Sheets-Sheet 2
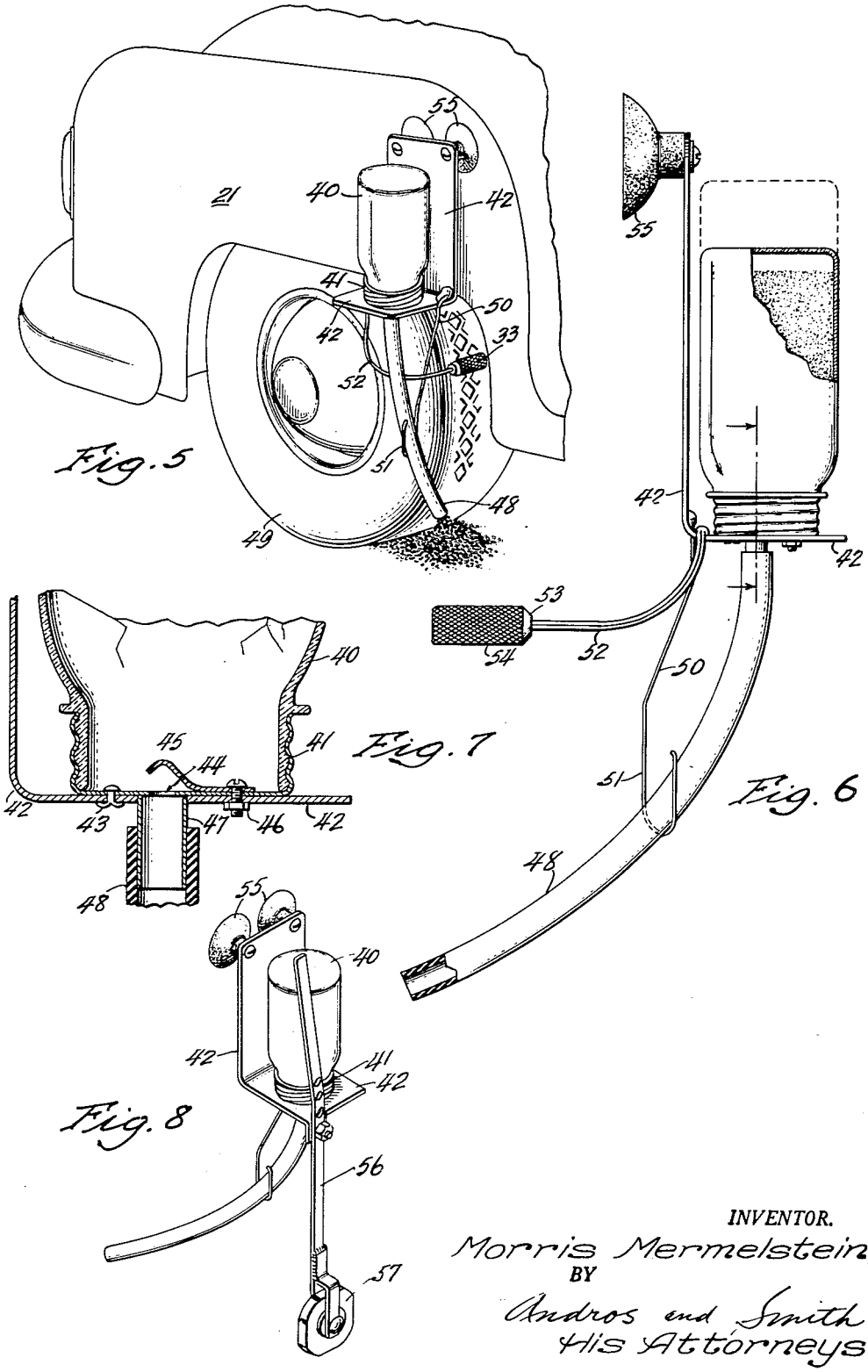
INVENTOR.
Morris Mermelstein,
BY
Andros and Smith
His Attorneys.

United States Patent Office 2,752,182
Patented June 26, 1956

2,752,182
VIBRATORY SANDER

Morris Mermelstein, Schodack Center, N. Y.

Application May 16, 1952, Serial No. 288,284

5 Claims. (Cl. 291—25)

This invention relates to improvements in sanding devices for automotive vehicles. More particularly, it pertains to a novel, automatically operable, vibratory sanding device, adapted readily to be affixed in position adjacent the fender and one or more wheels of a vehicle, or readily to be removed therefrom to be stored in the trunk compartment or elsewhere when desired, and the provision of such a device is one of the principal objects of the invention.

I am well aware that numerous sanding devices have heretofore been suggested, some of which have appeared on the market; but these devices comprise huge and bulky sand boxes with hoppers, gate valves, dash board or other forward control mechanisms manually operated by the driver of the vehicle, designed permanently to be made a part of the vehicle and located in a concealed position in the trunk, under the rear seat of the car, or elsewhere. Furthermore, such devices are relatively expensive when purchased and the additional cost of installation makes the total cost prohibitive to many motor vehicle owners.

There has been a long felt want in this field for a sanding device which would overcome the foregoing difficulties and disadvantages, and this has now been accomplished by means of the present invention.

Generally, therefore, it is another object of the invention to provide a sanding device that is relatively economic to manufacture, to sell and to install, that is simple, yet sturdy and durable of construction, positive in operation, and which will function with relative freedom of wear and tear, as well as other mechanical difficulties.

More specifically, it is an object of the invention to provide such a device having storing means adapted to be secured adjacent a fender by securing means in a manner such that the device will be caused to vibrate when the vehicle wheels are rotated and to cause sand to escape therefrom, conduit means connected to the device and adapted to direct escaping sand to the path of the wheels, and sand escape controlling mechanism, including means connected to the device and adapted to be brought into contacting engagement with the wheel, normally to check the escape of sand until the wheel is rotated, and then automatically to release a quantity of sand while the wheel is rotating.

Other specific objects of the invention are the provision of such a device which includes a sand storing means comprising a removable and refillable container; in which the securing means constitutes a resilient connecting member adapted to suspend the sand storing means in a stand-off position to permit the storing means readily to be vibrated; in which the securing means includes a fender clamp, a resilient member secured to the clamp, and the sand storing means secured to the resilient member; in which the securing means comprises a rubber suction cup adapted to connect the sand storing means to the fender in a manner such as to enhance the vibration thereof; in which the sand storing means comprises a container having a constructed sand outlet port communicating with the conduit, and a baffle member overlying the port normally to check the flow of sand and to permit the sand to flow therethrough and into the conduit; in which the sand storing means comprises a container having a constricted sand outlet port communicating with the conduit, a baffle member overlying the port, and adjusting means adapted to move the member toward and away from the port; in which the securing means includes a tensioning member connected to the sand storing means and adapted to engage the fender; in which the sand escape controlling mechanism comprises an arm connected to the device and terminating in a rotatable or vibratory member adapted to contact the wheel and be rotated or vibrated thereby; and in which the rotating or vibratory member may comprise either a roller having flat spots around its periphery, or a knurled periphery, adapted either to contact the wheel or, when desired to contact the ground surface over which the wheel passes.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Fig. 1 illustrates a preferred form of the invention affixed in position to the left rear fender of an automobile;

Fig. 2 is a perspective view, somewhat enlarged, and further illustrating the preferred embodiment of Fig. 1;

Fig. 3 is a fragmentary portion of the device, somewhat enlarged, showing the clamping means for holding the device in position on the fender;

Fig. 4 is a fragmentary sectional view through the bottom of container showing means for adjusting the quantity of sand that may be permitted to flow therefrom;

Fig. 5 is a view similar to Fig. 1 illustrating a modification of the invention;

Fig. 6 is a side elevational view of the modification of the invention depicted in Fig. 5;

Fig. 7 is a fragmentary sectional view taken through the bottom of the container showing the position of the baffle means which controls the flow of sand therefrom; and Fig. 8 is a view similar to Fig. 6 with a different arrangement of vibrating element constructed somewhat after the fashion of that depicted in the preferred embodiment, but adapted to contact a ground surface rather than a wheel of the vehicle.

Referring now more particularly to the drawings, there is indicated generally at 10 a preferred form of the invention which comprises a semi-cylindrical container 11 having a screw cap 12 thereon through which the same can be filled with sand, grit, or other suitable particles which are commercially sold in the open market. The container 11 is fitted into a bottom section 13 for convenience in removal if desired.

At one side of the container is a clamp member indicated generally at 14. This comprises a fixed piece 15 having secured thereto one or more resilient members 16, preferably made of rubber, although these members may be substituted for suitable springs. The container 11 is permanently secured to the clamp through the rubber members, or vibratory bushings 16. A loosely mounted portion 17 is held to the member 15 by a spacer ring 18 and both members 15 and 17 are connected by a tightening screw 19. This clamping arrangement permits the device readily to be affixed in positioning on a fender as indicated in dotted line position 21.

Also projecting from the container 11 is a spring finger 22. Passing through this finger is a threaded hook 23 which is adapted to engage the inner side of the fender and, by means of the nut 24, the container portion of the device can be made to vibrate more or less as desired in accordance with the tightening of the nut. This arrangement also aids in holding the device more firmly fixed in position.

Within the container there is preferably mounted a baffle member, or plate, shown in Fig. 4 at 25. Passing upwardly through the bottom of the container is a thumb screw 26 which is adapted to urge the baffle member 25 upwardly more or less as shown by the dotted line position of the later. This baffle member overlies a constricted opening 27 in the bottom of the container through which the sand is permitted to escape. Leading from this opening, and in communication therewith, is a conduit nopple 28. A rubber hose conduit, or other suitable type of conduit 29, is connected to the nipple and is directed toward the path of the wheel adjacent which the device is mounted as depicted in Fig. 1.

Extending from the container 11 is an arm 30. Pivotally mounted on this arm 30 is another arm 31 which is secured in position to be adjusted at any desired angle by means of a nut and bolt arrangement 32, the bolt portion of which passes through suitable holes provided therefor in the arms 30 and 31. At the end of the arm 31 is a bifurcated element or bearing 33. Mounted between the forks of this member is a roller 34, held in position by virtue of a nut and bolt arrangement 35 passing through the bifurcated prongs and through the roller. The roller is peripherally provided with flat spots 36. This roller preferably is intended to be brought into contact with the adjacent wheel although it is within the contemplation of the invention, as more fully described hereinafter in connection with Fig. 8, to bring such roller in contact with the ground surface on which the vehicle rests.

In operation, the baffle 25 is so adjusted by means of thumb screw 26 that sand, when placed into the container 11, will flow in a desired quantity. As the rear wheel 37 is rotated the roller 34 is likewise rotated. Because of the flat spots 36, vibration is imparted to the container 11 because it is resiliently suspended in position by means of the rubber bushings 16. The vibration causes the sand within the container to pass downwardly through the port 27 and through the conduit 29 where the sand is expelled or sprayed in the path of the wheel 37.

Referring now to the modification shown in Figs. 5 6 and 7, it will be observed that the principle embodied by the invention is substantially the same with the exception that somewhat different structure has been illustrated. In this embodiment the sand storing means comprises a glass jar of the Mason type indicated at 40. This is screw-threaded into the top cap 41 which is affixed in position to an L-shaped bracket 42 by means of rivet 43. The L-shaped bracket, as well as the cap, has a constricted sand outlet port 44. A baffle 45 is held in partly spaced relation above the port 44 by means of a bolt and nut arrangement 46. A nipple 47 communicates with the port 45 and a flexible conduit, such as the rubber hose 48, is connected to the nipple. The conduit 48 is directed toward the path of the vehicle wheel 49 and may be adjusted to any desired position by bending the rod 50 adjacent the hook portion 51, the rod being connected to the L-shaped bracket 42.

An arm 52 is also connected to the L-shaped bracket and has affixed at its end a member which preferably is rotatable as indicated at 53. This member has its peripheral portion knurled as at 54 so that the same will enhance vibration of the arm 52, and consequently the jar containing the sand 40, when the member 54 is brought into contact with the wheel 49. The L-shaped bracket in this instance preferably is held in position by one or more large suction cups 55.

In the modification shown in Fig. 8 the only difference is an arm 56 which is pivotally mounted on the L-shaped bracket and contains a roller 57 of the type illustrated in Figs. 1 and 2. With this type of arrangement the arm 56 can be brought into ground contacting relation rather than in wheel contacting relation although it will at once be obvious that a universal joint can be provided, whereby the arm 56 can be brought either into contacting relation with the wheel 49 or a ground surface 57.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A demountable vibratory sanding device for use on an automobile, comprising an L-shaped bracket; a resilient suction cup secured adjacent the top of said bracket for removable attachment to the outside of a rear fender to hold said bracket in a suspended, stand-off position therefrom adjacent a rear wheel; a rigid container for holding a quantity of loosely divided sand therein, and having an opening at its bottom for the passage of said sand; a fixed baffle in the bottom of said container, overlying said opening and in spaced relation thereto normally to check the flow of sand from said container until the same is vibrated; a flexible conduit connected to said bracket in communication with said opening to extend downwardly to a point adjacent the path of said wheel; and an arm connected to said bracket at one end extending downwardly to contact said wheel at its other end to cause said bracket and container to vibrate when said wheel is in motion to scatter sand in the path of said wheel.

2. A sanding device for use on automobiles comprising a sand container, resilient mounting means to removably support said container on an automobile adjacent a rear wheel, a bottom outlet in said container, a baffle to prevent outflow of sand when said container does not vibrate, a substantially rigid arm secured to said container, and means mounted on said arm to contact the adjacent rear wheel whereby upon rotation of said rear wheel said container is caused to vibrate.

3. The sanding device of claim 2 in which the resilient means comprises resilient suction cups.

4. The sanding device of claim 2 in which a flexible hose is connected to the outlet in said container and a deformable rod secured to the mounting means supplies a support to direct the end of said hose to discharge sand adjacent the tread of said rear wheel.

5. The sanding device of claim 2 in which the means to contact the adjacent rear wheel comprises a rotatable knurled element adapted to be driven by contact with the tread of a tire mounted on said wheel.

References Cited in the file of this patent

UNITED STATES PATENTS

| | | |
|---|---|---|
| 866,504 | McCormack | Sept. 17, 1907 |
| 866,721 | Hall | Sept. 24, 1907 |
| 2,223,722 | Farrell | Dec. 3, 1940 |
| 2,433,684 | Damond | Dec. 30, 1947 |

FOREIGN PATENTS

| | | |
|---|---|---|
| 448,830 | Germany | Aug. 31, 1927 |